(12) United States Patent
Zhang et al.

(10) Patent No.: US 12,555,880 B2
(45) Date of Patent: Feb. 17, 2026

(54) BATTERY COVER PLATE AND BATTERY

(71) Applicant: EVE POWER CO., LTD., Hubei (CN)

(72) Inventors: Lei Zhang, Hubei (CN); Liming Huang, Hubei (CN); He Zhao, Hubei (CN); Yuebin Xu, Hubei (CN); Wei He, Hubei (CN)

(73) Assignee: EVE POWER CO., LTD., Jingmen (CN)

( * ) Notice: Subject to any disclaimer, the term of this patent is extended or adjusted under 35 U.S.C. 154(b) by 445 days.

(21) Appl. No.: 18/003,426

(22) PCT Filed: Oct. 14, 2022

(86) PCT No.: PCT/CN2022/125234
§ 371 (c)(1),
(2) Date: Dec. 27, 2022

(87) PCT Pub. No.: WO2024/031828
PCT Pub. Date: Feb. 15, 2024

(65) Prior Publication Data
US 2024/0322410 A1   Sep. 26, 2024

(30) Foreign Application Priority Data

Aug. 10, 2022  (CN) .......................... 202222094383.6

(51) Int. Cl.
*H01M 50/636* (2021.01)
*H01M 50/184* (2021.01)
*H01M 50/186* (2021.01)

(52) U.S. Cl.
CPC ....... *H01M 50/636* (2021.01); *H01M 50/184* (2021.01); *H01M 50/186* (2021.01)

(58) Field of Classification Search
None
See application file for complete search history.

(56) References Cited

U.S. PATENT DOCUMENTS

2009/0075169 A1   3/2009  Kim et al.

FOREIGN PATENT DOCUMENTS

| CN | 205582983 U | 9/2016 |
|---|---|---|
| CN | 208256801 U | 12/2018 |

(Continued)

OTHER PUBLICATIONS

Hiroki, JP 2016081826 A, English Translation from FIT, 5 pages (Year: 2016).*

(Continued)

*Primary Examiner* — Colin W. Slifka
(74) *Attorney, Agent, or Firm* — PV IP PC; Wei Te Chung

(57) ABSTRACT

The present application provides a battery cover plate and a battery. The battery cover plate includes a cover plate body, a first seal, a second seal, and a sealing ring. The cover plate body is provided with a liquid injection hole, the first seal is attached to a hole wall of the liquid injection hole and is provided with a threaded hole extending along an axis direction of the liquid injection hole. The second seal includes a head and a connecting part, a diameter of the head is greater than a diameter of the connecting part, a first step surface is defined between the head and the connecting part, the connecting part is provided with an external thread threadedly connected to the threaded hole. The sealing ring is sleeved on the connecting part and located between the first step surface and an upper surface of the cover plate body.

20 Claims, 1 Drawing Sheet

(56) References Cited

FOREIGN PATENT DOCUMENTS

| CN | 111192982 | A |   | 5/2020 |
|----|-----------|---|---|--------|
| CN | 112332044 | A |   | 2/2021 |
| CN | 113013526 | A |   | 6/2021 |
| CN | 215896640 | U |   | 2/2022 |
| DE | 102012224250 | A1 |   | 7/2014 |
| JP | 2016081826 | A | * | 5/2016 |

OTHER PUBLICATIONS

European Office Action issued in corresponding European Patent Application No. 22821846.7 dated Feb. 17, 2025, pp. 1-8.
International Search Report in International application No. PCT/CN2022/125234, mailed on Mar. 23, 2023.
Written Opinion of the International Search Authority in International application No. PCT/CN2022/125234, mailed on Mar. 23, 2023.

* cited by examiner

_US 12,555,880 B2_

BATTERY COVER PLATE AND BATTERY

CROSS-REFERENCE TO RELATED APPLICATION

This application is a National Stage Appl. filed under 35 USC 371 of International Patent Application No. PCT/CN2022/125234 with an international filing date of Oct. 14, 2022, designating the United States, now pending, and further claims priority benefits to Chinese Patent Application No. 202222094383.6 filed on Aug. 10, 2022. The content of the aforementioned application is incorporated herein by reference.

TECHNICAL FIELD

The present application relates to the field of battery technology, and, more particularly, to a battery cover plate and a battery.

BACKGROUND

In a production process of batteries, after liquid injection of a battery, a liquid injection hole on a battery cover plate is sealed to prevent electrolyte leakage and isolate a battery cell from external environment, thus ensuring a chemical environment required for battery operation.

In relevant technologies, rubber particles are generally applied to seal the liquid injection hole first, and then sealing nails are welded to seal the liquid injection hole. The sealing method not only has a complex process, but also has a high cost for welding and sealing the liquid injection hole. At a same time, after liquid injection of the battery, the electrolyte is generally volatized at the liquid injection hole, which is easy to cause poor welding when the sealing nails are welded. During long-term use of the battery, a sealing effect of the rubber particles becomes worse, which causes the battery to lose sealing performance and have a serious safety hazard.

SUMMARY

A battery cover plate is provided in the present application, the battery cover plate seals a liquid injection hole without welding, thereby solving a problem of poor welding when sealing the liquid injection hole by welding, and reducing a serious safety hazard during long-term use of a battery.

A battery is provided in the present application. By applying the above-mentioned battery cover plate, the potential safety hazard of the battery during long-term use is reduced, and a safety factor of the battery is improved.

In a first aspect, a battery cover plate is provided in embodiments of the present application, including:
 a cover plate body provided with a liquid injection hole;
 a first seal, wherein at least a part of the first seal is located in the liquid injection hole and attached to a hole wall of the liquid injection hole, and the first seal is provided with a threaded hole extending along an axis direction of the liquid injection hole;
 a second seal, wherein the second seal includes a head and a connecting part connected to each other, a diameter of the head is greater than a diameter of the connecting part, a first step surface is defined between the head and the connecting part, the connecting part is provided with an external thread, and the external thread is threadedly connected to the threaded hole; and
 a sealing ring, wherein the sealing ring is sleeved on the connecting part and located between the first step surface and an upper surface of the cover plate body.

In an embodiment, a surface of the external thread of the connecting part and/or the threaded hole is provided with a first adhesive layer.

In an embodiment, the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively.

In an embodiment, an outer diameter of the sealing ring is less than an outer diameter of the head, and a second adhesive layer is disposed between the first step surface and the inner bottom surface of the recess portion.

In an embodiment, a cross-section of the recess portion (11) is in a shape of an inverted circular truncated cone, a diameter $d_1$ of a top surface of the recess portion (11) ranges from 3 mm to 10 mm, a relationship between a diameter $d_2$ of a bottom surface of the recess portion (11) and the diameter $d_1$ of the top surface of the recess portion (11) satisfies with: $0.7d_1 \leq d_2 \leq 0.9d_1$, and a relationship between a diameter $d_3$ of the threaded hole and the diameter $d_2$ of the bottom surface of the recess portion (11) satisfies with: $0.5d_2 \leq d_3 \leq 0.7d_2$.

In an embodiment, a depth h of the recess portion ranges from 0.5 mm to 1 mm.

In an embodiment, the first seal includes a first part and a second part arranged up and down and connected to each other, and an outer diameter of the first part is less than an outer diameter of the second part, a second step surface is defined between the first part and the second part, the threaded hole penetrates the first part and the second part, a side wall of the first part is attached to the hole wall of the liquid injection hole, and the second step surface is attached to a lower surface of the cover plate body.

In an embodiment, the first part is in interference fit with the liquid injection hole.

In an embodiment, a length L of the second seal ranges from 1.5 mm to 5 mm.

In a second aspect, a battery is provided in the embodiments of the present application, including a battery body, a battery housing, and the battery cover plate as defined above, wherein the battery cover plate is disposed on the battery housing, and the battery body is received in an accommodating cavity defined by the battery housing and the battery cover plate.

BENEFICIAL EFFECTS OF THE PRESENT APPLICATION

The battery cover plate is provided in the present application, at least a part of the first seal is attached to the hole wall of the liquid injection hole, and at a same time, the connecting part of the second seal is threadedly connected to the first seal, and the sealing ring is clamped between the first step surface and the upper surface of the cover plate body, as such a leakage of electrolyte can be prevented. Therefore, a sealing of the liquid injection hole can be realized only by a cooperation of the first seal, the second seal, and the sealing ring. A sealing process is simple, a sealing effect is good, and the liquid injection hole can be sealed without welding. The battery cover plate solves the problem of poor welding easily when the liquid injection hole is sealed by welding, and reduces the safety hazard during long-term use of a battery.

The present application also provides a battery, by applying the above-mentioned battery cover plate, the safety hazard during long-term use of the battery is reduced, and the safety of the battery is improved.

Figure 1:
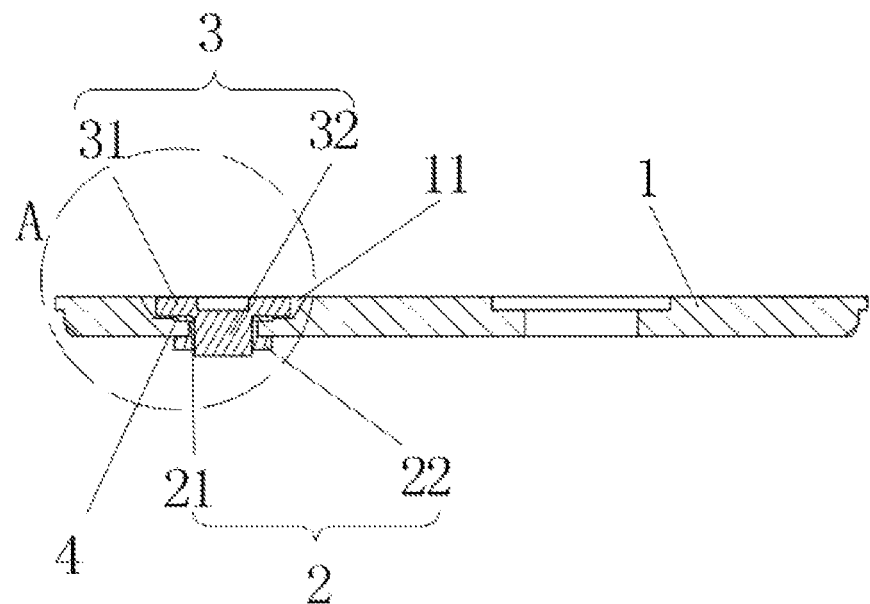
FIG. 1 is a cross-sectional view of a battery cover plate in embodiments of the present application.

REFERENCE NUMERALS 1, cover plate body; 11, recess portion; 2, first seal; 21, first part; 22, second part; 3, second seal; 31, head; 32, connecting part; 4, sealing ring.

DETAILED DESCRIPTION OF THE EMBODIMENT

In the description of this present application, terms indicating orientation or location relationships such as "up", "down", "left", "right", "vertical", "horizontal", "inside", "outside", etc. are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present disclosure. In addition, terms "first" and "second" are only used to distinguish in terms of description and can not be understood as indicating or implying relative importance. Terms "first position" and "second position" are two different positions.

Unless otherwise specified and defined, terms "install", "contacted", and "fixed" should be understood in a broad sense, for example, it may be a fixed connection, a detachable connection; it may be a mechanical connection or an electrical connection; it may be a directly connection or an indirectly connection through an intermediate media; and it may be an internal connection of two components or an interaction relationship between two components. For those skilled in the art, meanings of the above terms in the present disclosure can be understood according to situations.

Unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "above" or "up" the second feature includes that the first feature is directly above or obliquely above the second feature, or only indicate that a horizontal height of the first feature is greater than a horizontal height of the second feature. That the first feature is disposed "below", "under", or "underneath" of the second feature include that the first feature is directly below or obliquely below the second feature, or only indicate that the horizontal height of the first feature is less than the horizontal height of the second feature.

Technical solution of the present application is be described in further detail below in conjunction with the drawings and embodiments.

Figure 2:
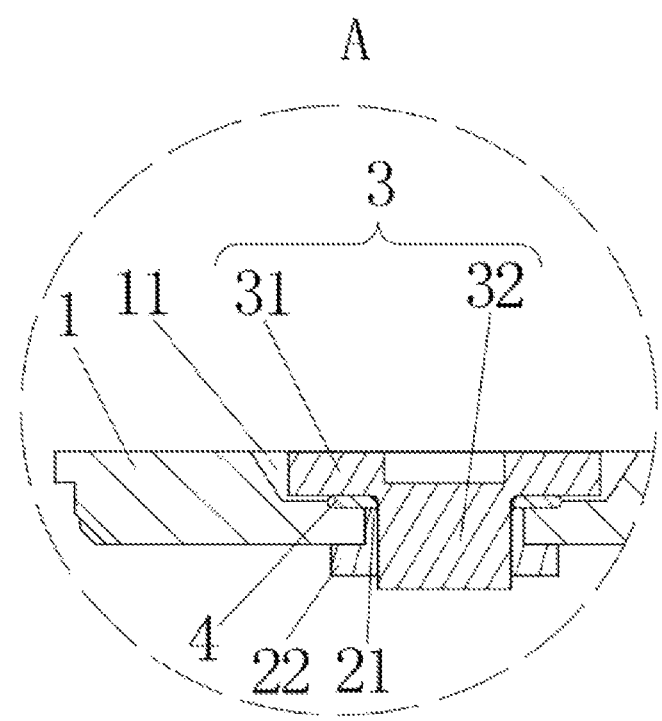
FIG. 2 is a partial enlarged view of part A in FIG. 1.

As shown in FIG. 1 and FIG. 2, a battery cover plate is provided in this embodiment. The battery cover plate includes a battery body, a battery housing, and a battery cover plate. The battery cover plate is disposed on the battery housing. The battery body is received in an accommodating cavity defined by the battery housing and the battery cover plate. The battery cover plate includes a cover plate body 1, a first seal 2, a second seal 3, and a sealing ring 4. The cover plate body 1 is provided with a liquid injection hole. At least a part of the first seal is located in the liquid injection hole and attached to a hole wall of the liquid injection hole, and the first seal 2 is provided with a threaded hole extending along an axis direction of the liquid injection hole. The second seal 3 includes a head 31 and a connecting part 32 connected to each other, a diameter of the head 31 is greater than a diameter of the connecting part 32, a first step surface is defined between the head 31 and the connecting part 32, the connecting part 32 is provided with an external thread, and the external thread is threadedly connected to the threaded hole. The sealing ring 4 is sleeved on the connecting part 32 and located between the first step surface and an upper surface of the cover plate body 1.

At least a part of the first seal 2 is attached to the hole wall of the liquid injection hole, and at a same time, the connecting part 32 of the second seal 3 is threadedly connected to the first seal 2, and the sealing ring 4 is clamped between the first step surface and the upper surface of the cover plate body 1, as such, a leakage of electrolyte can be prevented. Therefore, a sealing of the liquid injection hole can be realized only by a cooperation of the first seal 2, the second seal 3, and the sealing ring 4. A sealing process is simple, a sealing effect is good, and the liquid injection hole can be sealed without welding. The battery cover plate solves a problem of poor welding easily when the liquid injection hole is sealed by welding, and reduces a safety hazard during long-term use of the battery.

As shown in FIG. 1 and FIG. 2, in order to facilitate an installation of the first seal 2, and realize quick matching between the first seal 2 and the liquid injection hole, the first seal 2 includes a first part 21 and a second part 22 arranged up and down and connected to each other. An outer diameter of the first part 21 is less than an outer diameter of the second part 22. A second step surface is defined between the first part 21 and the second part 22. The threaded hole penetrates through the first part 21 and the second part 22. A side wall of the first part 21 is attached to the hole wall of the liquid injection hole. The second step surface is attached to a lower surface of the cover plate body 1. At a same time, the first part 21 is in interference fit with the liquid injection hole. Therefore, by applying a pressing force to the second part 22, the first part 21 can be assembled to the liquid injection hole, so as to realize the interference fit between the first part 21 and the liquid injection hole, and the operation is simple and efficient.

As shown in FIG. 1 and FIG. 2, in order to provide a flatness of an upper surface of the battery cover plate after the sealing ring 4 and the second seal 3 are installed and prevent the head 31 of the second seal 3 from protruding from the upper surface of the battery cover plate, in this embodiment, a countersunk bolt is selected for the second seal 3. At a same time, the cover plate body 1 is further provided with a recess portion 11, the recess portion 11 is arranged around the liquid injection hole and communicated with the liquid injection hole, the recess portion 11 is configured to accommodate the head 31, and two ends of the sealing ring 4 are attached to the first step surface and an inner bottom surface of the recess portion 11, respectively.

As shown in FIG. 1 and FIG. 2, a cross-section of the recess portion 11 is in a shape of an inverted circular truncated cone to adapt to a shape of the head 31 of the second seal 3. At a same time, in order to prevent the recess portion 11 from occupying too much space of the battery cover plate and reducing overall strength of the battery housing, a diameter $d_1$ of a top surface of the recess portion 11 ranges from 3 mm to 10 mm, a relationship between a diameter $d_2$ of a bottom surface of the recess portion 11 and the diameter $d_1$ of the top surface of the recess portion 11 satisfies with: $0.7d_1 \leq d_2 \leq 0.9d_1$, and a relationship between a diameter $d_3$ of the threaded hole and the diameter $d_2$ of the bottom surface of the recess portion 11 satisfies with: $0.5d_2 \leq d_3 \leq 0.7d_2$.

To improve sealing performance, an outer diameter of the sealing ring 4 is less than an outer diameter of the head 31, and a second adhesive layer is disposed between the first step surface and the inner bottom surface of the recess portion 11. The outer diameter of the head 31 is less than the diameter $d_2$ of the bottom surface of the recess portion 11. In addition, after installation of the second seal 3 and the sealing ring 4, because the two ends of the sealing ring 4 are attached to the first step surface and the inner bottom surface of the recess portion 11, respectively, and the outer diameter of the sealing ring 4 is less than the outer diameter of the head 31, there is a gap between the first step surface and the recess portion 11. Therefore, after installation of the second seal 3 and the sealing ring 4, glue can be poured along an inner wall of the recess portion 11 to flow into the gap between the first step surface and the recess portion 11. The glue is cured to form the second adhesive layer. The second adhesive layer can effectively isolate air and improve the sealing effect of the liquid injection hole. In other embodiments, the outer diameter of the head 31 can also be equal to the diameter of the bottom surface of the recess portion 11. It is sufficient to apply anaerobic adhesive on the first step surface before installing the second seal 3, which is not limited here.

Considering a thickness and overall strength of the battery cover plate, a depth h of the recess portion 11 ranges from 0.5 mm to 1 mm, so as to prevent the recess portion 11 from being too deep and the liquid injection hole of the battery cover from being weak. If the depth of the recess portion 11 is too deep, it is easy to damage the liquid injection hole of the battery cover plate when the first seal 2 is installed by pressing.

In order to ensure a connection length between the second seal 3 and the first seal 2, and avoid the second seal 3 from occupying too much space inside the battery, a length L of the second seal 3 ranges from 1.5 mm to 5 mm.

In this embodiment, in order to avoid a reduce on the sealing effect caused by a gap between the connecting part 32 and the threaded hole after the first seal 2 and the second seal 3 are matched, a surface of the external thread of the connecting part 32 of the second seal 3 and/or the threaded hole is provided with a first adhesive layer. In an embodiment, the first adhesive layer is formed by curing an anaerobic adhesive, and the anaerobic adhesive is cured to form the first adhesive layer after the connecting part 32 is matched with the threaded hole of the first seal 2. By providing the first adhesive layer, while ensuring the sealing effect, a connection between the connecting part 32 and the threaded hole can be made tighter, and the second seal 3 can be locked at a same time, so as to prevent the second seal 3 from loosening from the threaded hole due to vibration during long-term use of the battery.

A sealing process of the liquid injection hole in the battery cover plate is as follows:

First, completing a match between the first seal 2 and the battery cover plate, that is, applying a pressing force to the first seal 2 to make the first part 21 of the first seal 2 be in interference fit with the liquid injection hole. Next, the battery cover plate matched with the first seal 2 is placed on the battery body, and liquid injection to the battery is completed through the threaded hole on the first seal 2.

After the battery liquid injection is completed, the second seal 3 sleeved with the sealing ring 4 and provided with the anaerobic adhesive on the external thread is connected with the first seal 2, and the glue is poured along the inner wall of the recess portion 11 to flow into the gap between the first step surface and the recess portion 11. The glue is cured to form the second adhesive layer, so as to seal the liquid injection hole on the battery cover plate.

What is claimed is:

1. A battery cover plate comprising:
   a cover plate body provided with a liquid injection hole;
   a first seal, wherein at least a part of the first seal is located in the liquid injection hole and attached to a hole wall of the liquid injection hole, and the first seal is provided with a threaded hole extending along an axis direction of the liquid injection hole;
   a second seal, wherein the second seal comprises a head and a connecting part connected to each other, a diameter of the head is greater than a diameter of the connecting part, a first step surface is defined between the head and the connecting part, the connecting part is provided with an external thread, and the external thread is threadedly connected to the threaded hole; and
   a sealing ring, wherein the sealing ring is sleeved on the connecting part and located between the first step surface and an upper surface of the cover plate body.

2. The battery cover plate of claim 1, wherein at least one of a surface of the external thread of the connecting part and the threaded hole is provided with a first adhesive layer.

3. The battery cover plate of claim 1, wherein the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively.

4. The battery cover plate of claim 3, wherein an outer diameter of the sealing ring is less than an outer diameter of the head, and a second adhesive layer is disposed between the first step surface and the inner bottom surface of the recess portion.

5. The battery cover plate of claim 3, wherein a cross-section of the recess portion is in a shape of an inverted circular truncated cone, a diameter $d_1$ of a top surface of the recess portion ranges from 3 mm to 10 mm, a relationship between a diameter $d_2$ of a bottom surface of the recess portion and the diameter $d_1$ of the top surface of the recess portion satisfies with: $0.7d_1 \leq d_2 \leq 0.9d_1$, and a relationship between a diameter $d_3$ of the threaded hole and the diameter $d_2$ of the bottom surface of the recess portion satisfies with: $0.5d_2 \leq d_3 \leq 0.7d_2$.

6. The battery cover plate of claim 3, wherein a depth h of the recess portion ranges from 0.5 mm to 1 mm.

7. The battery cover plate of claim 1, wherein the first seal comprises a first part and a second part arranged up and down and connected to each other, and an outer diameter of the first part is less than an outer diameter of the second part, a second step surface is defined between the first part and the second part, the threaded hole penetrates the first part and the second part, a side wall of the first part is attached to the hole wall of the liquid injection hole, and the second step surface is attached to a lower surface of the cover plate body.

8. The battery cover plate of claim 7, wherein the first part is in interference fit with the liquid injection hole.

9. The battery cover plate of claim 1, wherein a length L of the second seal ranges from 1.5 mm to 5 mm.

10. The battery cover plate of claim 1, wherein at least one of a surface of the external thread of the connecting part and the threaded hole is provided with a first adhesive layer;
a length L of the second seal ranges from 1.5 mm to mm.

11. The battery cover plate of claim 1, wherein the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively;
a length L of the second seal ranges from 1.5 mm to 5 mm.

12. The battery cover plate of claim 1, wherein the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively;
an outer diameter of the sealing ring is less than an outer diameter of the head, and a second adhesive layer is disposed between the first step surface and the inner bottom surface of the recess portion;
a length L of the second seal ranges from 1.5 mm to 5 mm.

13. The battery cover plate of claim 1, wherein the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively;
a cross-section of the recess portion is in a shape of an inverted circular truncated cone, a diameter $d_1$ of a top surface of the recess portion ranges from 3 mm to 10 mm, a relationship between a diameter $d_2$ of a bottom surface of the recess portion and the diameter $d_1$ of the top surface of the recess portion satisfies with: $0.7d_1 \leq d_2 \leq 0.9d_1$, and a relationship between a diameter $d_3$ of the threaded hole and the diameter $d_2$ of the bottom surface of the recess portion satisfies with: $0.5d_2 \leq d_3 \leq 0.7d_2$;
a length L of the second seal ranges from 1.5 mm to 5 mm.

14. The battery cover plate of claim 1, wherein the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively;
a depth h of the recess portion ranges from 0.5 mm to 1 mm;
a length L of the second seal ranges from 1.5 mm to 5 mm.

15. The battery cover plate of claim 1, the first seal comprises a first part and a second part arranged up and down and connected to each other, and an outer diameter of the first part is less than an outer diameter of the second part, a second step surface is defined between the first part and the second part, the threaded hole penetrates the first part and the second part, a side wall of the first part is attached to the hole wall of the liquid injection hole, and the second step surface is attached to a lower surface of the cover plate body;
a length L of the second seal ranges from 1.5 mm to 5 mm.

16. A battery, comprising a battery body, a battery housing, and a battery cover plate, wherein the battery cover plate is disposed on the battery housing, and the battery body is received in an accommodating cavity defined by the battery housing and the battery cover plate; the battery cover plate comprises:
a cover plate body provided with a liquid injection hole;
a first seal, wherein at least a part of the first seal is located in the liquid injection hole and attached to a hole wall of the liquid injection hole, and the first seal is provided with a threaded hole extending along an axis direction of the liquid injection hole;
a second seal, wherein the second seal comprises a head and a connecting part connected to each other, a diameter of the head is greater than a diameter of the connecting part, a first step surface is defined between the head and the connecting part, the connecting part is provided with an external thread, and the external thread is threadedly connected to the threaded hole; and
a sealing ring, wherein the sealing ring is sleeved on the connecting part and located between the first step surface and an upper surface of the cover plate body.

17. The battery cover plate of claim 16, wherein at least one of a surface of the external thread of the connecting part and the threaded hole is provided with a first adhesive layer.

18. The battery cover plate of claim 16, wherein the cover plate body is further provided with a recess portion, the recess portion is annularly arranged around the liquid injection hole and communicated with the liquid injection hole, the recess portion is configured to accommodate the head, and two ends of the sealing ring are attached to the first step surface and an inner bottom surface of the recess portion, respectively.

19. The battery cover plate of claim 18, wherein an outer diameter of the sealing ring is less than an outer diameter of the head, and a second adhesive layer is disposed between the first step surface and the inner bottom surface of the recess portion.

20. The battery cover plate of claim 18, wherein a cross-section of the recess portion is in a shape of an inverted circular truncated cone, a diameter $d_1$ of a top surface of the recess portion ranges from 3 mm to 10 mm, a relationship between a diameter $d_2$ of a bottom surface of the recess portion and the diameter $d_1$ of the top surface of the recess portion satisfies with: $0.7d_1 \leq d_2 \leq 0.9d_1$, and a relationship between a diameter $d_3$ of the threaded hole and the diameter $d_2$ of the bottom surface of the recess portion satisfies with: $0.5d_2 \leq d_3 \leq 0.7d_2$.

* * * * *